United States Patent [19]

Han

[11] Patent Number: 5,734,514
[45] Date of Patent: Mar. 31, 1998

[54] COLLIMATE LENS ASSEMBLY IN LASER SCANNING UNIT

[75] Inventor: Ki Soo Han, Suwon, Rep. of Korea

[73] Assignee: Samsung Electro-Mechanics Co., Ltd., Suwon, Rep. of Korea

[21] Appl. No.: 692,675

[22] Filed: Aug. 6, 1996

[30] Foreign Application Priority Data

Oct. 31, 1995 [KR] Rep. of Korea ............... 1995-39526

[51] Int. Cl.[6] ........................................... C02B 7/02
[52] U.S. Cl. ........................................... 359/819
[58] Field of Search ........................... 359/819, 829, 359/830, 811, 198

[56] References Cited

U.S. PATENT DOCUMENTS

| | | | |
|---|---|---|---|
| 4,304,463 | 12/1981 | Tomori | 359/829 |
| 4,506,952 | 3/1985 | Grollimund | 359/829 |
| 4,727,529 | 2/1988 | Araki et al. | 369/44 |
| 4,820,911 | 4/1989 | Arackellian et al. | 235/467 |
| 5,062,096 | 10/1991 | Takagi | 369/44.38 |
| 5,161,061 | 11/1992 | Ihara et al. | 359/708 |
| 5,177,641 | 1/1993 | Kobayashi et al. | 359/820 |
| 5,299,067 | 3/1994 | Kutz et al. | 359/827 |
| 5,331,143 | 7/1994 | Marom et al. | 235/472 |
| 5,353,166 | 10/1994 | Hanford et al. | 359/819 |
| 5,506,719 | 4/1996 | Murakami et al. | 359/216 |
| 5,615,052 | 3/1997 | Doggett | 359/811 |

*Primary Examiner*—David C. Nelms
*Assistant Examiner*—Ricky Mack
*Attorney, Agent, or Firm*—Ladas & Parry

[57] ABSTRACT

The present invention relates to a collimate lens assembly of a laser scanning unit having an improved structure that includes a aperture cap for fixing the collimate lens, a support resiliently supporting the collimate lens and a aperture. The high accuracy collimate lens assembly is achieved according to the present invention without an additional assembling jig, thereby decreasing the assembly time, and the collimate lens can be securely held against any external shocks or vibrations, whereby the productivity is increased.

3 Claims, 2 Drawing Sheets

COLLIMATE LENS ASSEMBLY IN LASER SCANNING UNIT

BACKGROUND OF THE INVENTION

1. Field of the Invention

The present invention relates to a structure of assembling a laser scanning unit (LSU) for a laser beam printer, and more particularly to improvements in an aperture assembly for fitting a collimate lens into a laser diode module including a lens fitting cap, a supporter and an aperture. 2. Description of the Prior Art Generally, a collimate lens fitted into an aperture assembly is the core part in a laser diode module of the laser scanning unit for a laser beam printer, in which a high precision is required.

FIG. 1 shows the mounting and assembling structures of the collimate lens. The laser module of the LSU includes a lens case 1, a nut 2, a collimate lens 3, an aperture 4, a laser diode case 5, a printed circuit board 6 and a laser diode 7. The collimate lens 3 inserted into the aperture 4 is fixed with the nut 2 using a fitting jig and the aperture with the collimate lens 3 is mounted on the lens case 1. The aperture 4 has a platform 4a for mounting the collimate lens 3 and a female screw 4b to drive the nut 2 of which peripheral surface is toothed and has a groove 2h at the rear end thereof.

However, such structure necessitates a jig in driving the nut 2 after the collimate lens 3 is mounted on the aperture 4, whereby the assembling work is delayed and productively is lowered. Furthermore, there is an another problem that the centering of the collimate lens 3 on the aperture 4 is not accurate because of the tolerance of a screw which engage with the aperture 4 to fix the collimate lens 3. Moreover, the collimate lens 3 is apt to get damaged by the screw 2 which contacts surface of the collimate lens 3.

SUMMARY OF THE INVENTION

It is therefore an object of the invention to provide a novel collimate lens assembly for a laser scanning unit for fitting a collimate lens into assembly with a high centering accuracy and vibration proof.

The above object of the present invention can be achieved by a collimate lens assembly for a laser scanning unit having a lens case, a collimate lens, an aperture, a laser diode, and a case thereof, which comprises an aperture cap in which a threaded groove for the assembling and a penetrating hole for a laser diode, a support inserted into the groove for resiliently supporting the collimate lens, an aperture having a platform to position the collimate lens a toothed portion engaged with the threaded groove, the aperture engaged with the aperture cap in which the collimate lens and support are assembled and the assembly being fitted into the lens case.

In accordance with the above structure, the aperture cap can be manually engaged with the aperture using the knurl formed at the peripheral surface of the aperture cap without an additional assembling jig. Furthermore, the collimate lens can be assembled with a high accuracy of the centering of the collimate lens without any problems by the vibration or shock due to the resilient support.

Therefore, the parts need not be manufactured with a high precision.

Further objects and advantages of the present invention will be apparent from the following description of the preferred embodiments of the present invention as illustrated in the accompanying drawing.

DESCRIPTION OF THE PREFERRED EMBODIMENTS

Figure 1:
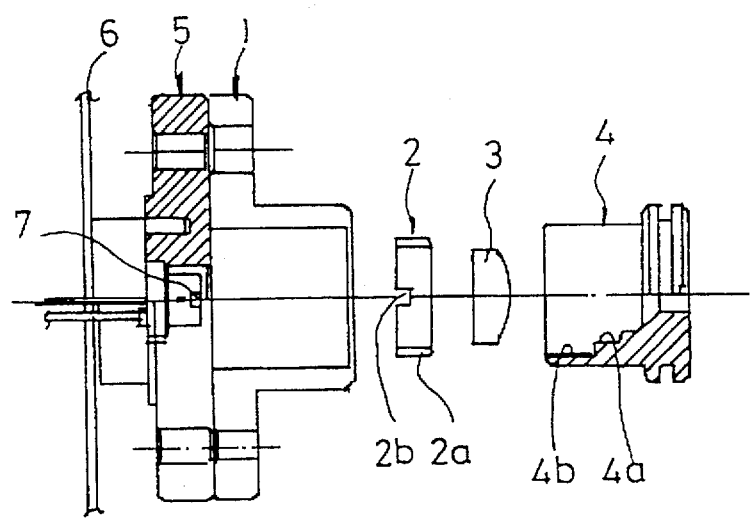
FIG. 1 is an exploded sectional view showing a prior collimate lens assembly.
Figure 2:
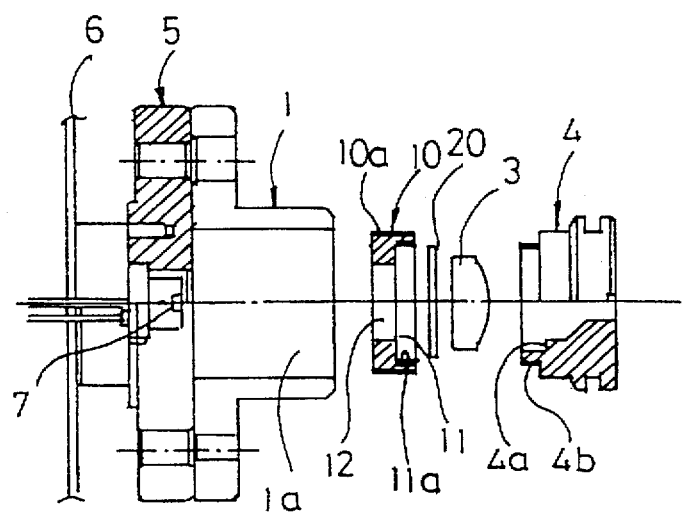
FIG. 2 is an exploded sectional view showing the structure of a collimate lens assembly according to the present invention.
Figure 3:
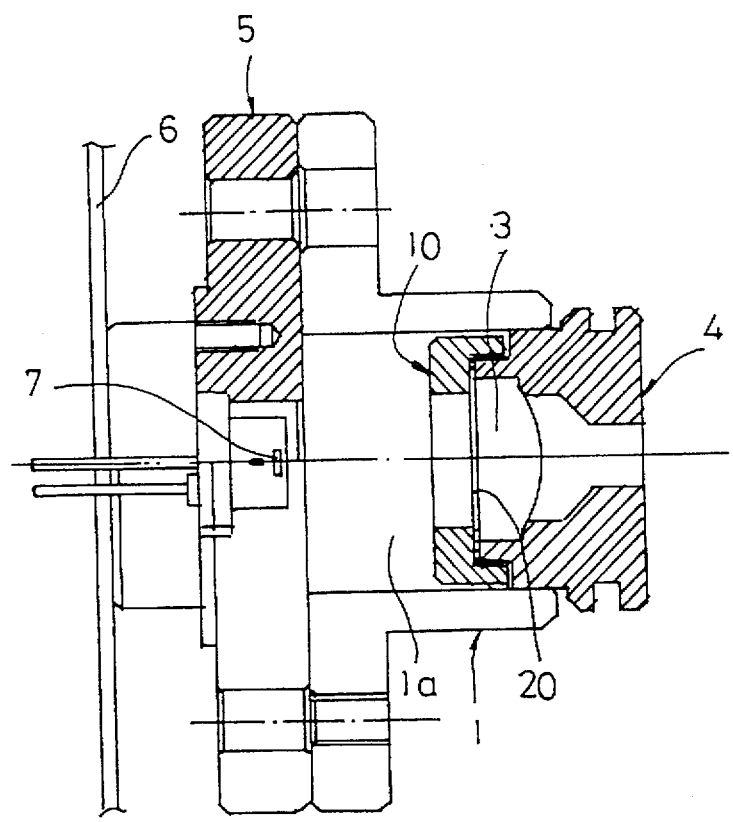
FIG. 3 is a sectional view of the collimate lens assembly in FIG. 2.

Referring to FIGS. 2 and 3, according to the present invention, the collimate lens assembly of a laser scanning unit which includes a lens case 1, a collimate lens 3, an aperture 4, a laser diode case 5, a printed circuit board 6 and a laser diode 7 comprises a cap 10 and a washer 20.

The aperture cap 10, of which the peripheral surface has a knurling 10a includes a groove 11 which has a threaded portion 11a at one side thereof and a penetrating hole 12 for a laser diode at the other side. Preferably, the washer 20 is a spring washer or a wave washer as a supporting means.

The aperture 4 includes a toothed portion 4b at the peripheral surface of the rear end thereof for engaging the threaded portion 11a formed at the aperture cap 10 and a platform 4a formed at the inside of the rear end for mounting the collimate lens 3 thereon.

Furthermore, the lens case 1 has a hole 1a into which the aperture assembly is fitted.

The collimate lens assembly according to the present invention is achieved by the following process.

The collimate lens 3 is inserted into the aperture 4 and thus mounted on the platform 4a of the aperture 4. Further, the aperture cap 10 is assembled into the aperture 4 with the washer 20 positioned at the rear end of the collimate lens 3 by engaging the threaded portion 11a of the aperture cap 10 with the toothed portion 4b formed at the aperture 4. Such assembling is performed manually in virtue of the knurling 10a formed at the peripheral surface of the aperture cap 10. When the aperture cap 10 is threaded with the aperture 4, the collimate lens 3 linearly contacts the platform 4a and is thus self-centered. Finally, the aperture assembly into which the collimate lens 3 is assembled is fitted into the hole 1a of the laser diode case 1. Accordingly, since the collimate lens 3 is resiliently supported by the spring or wave washer 20, the collimate lens 3 can be securely held against any external shocks or vibrations.

As described above, the collimate lens assembly for a laser scanning unit according to the present invention can be assembled by using the aperture cap and support without any separate assembling jig and thus assembling hours are saved to increase the productivity.

What is claimed is:

1. A collimate lens assembly for a laser scanning unit comprising a lens case, a collimate lens, an aperture, a laser diode, and a laser diode case, the collimate lens assembly comprising:

an aperture cap having a threaded groove for assembling and a hole for the laser diode, a support for resiliently supporting the collimate lens and inserted into the threaded groove of the aperture cap;

said aperture having a platform for mounting the collimate lens thereon and a tooth portion engaging with the threaded portion of the aperture cap;

said collimate lens and support being first assembled into the aperture, said aperture cap being engaged with the aperture and the assembly of the aperture and aperture cap being fitted into the lens case.

2. A collimate lens assembly as claimed in claim 1, wherein said aperture cap has a knurling at the peripheral surface thereof for manually assembling.

3. A collimate lens assembly as claimed in claim 1, wherein said support is a wave washer.

* * * * *